United States Patent
Tran-Quoc-Nam et al.

[11] Patent Number: 6,077,448
[45] Date of Patent: Jun. 20, 2000

[54] OIL/GRIT INTERCEPTOR

[75] Inventors: John Tran-Quoc-Nam, Scarborough; Matthew James Wilkinson, Hamilton, both of Canada

[73] Assignee: Wilkinson Heavy Precast, Dundas, Canada

[21] Appl. No.: 08/925,765

[22] Filed: Sep. 9, 1997

Related U.S. Application Data

[63] Continuation-in-part of application No. 08/726,687, Oct. 7, 1996, abandoned.

[51] Int. Cl.⁷ .................................................. B01D 21/24
[52] U.S. Cl. ...................... 210/790; 210/800; 210/254; 210/519; 210/521; 210/532.1; 210/538
[58] Field of Search ........................... 210/790, 800, 210/801, 164, 170, 254, 521, 532.1, 538, 540, 519

[56] References Cited

U.S. PATENT DOCUMENTS

| | | | |
|---|---|---|---|
| 3,282,436 | 11/1966 | Mulm | 210/532.1 |
| 3,374,894 | 3/1968 | Webster | 210/532.1 |
| 4,136,010 | 1/1979 | Pilie et al. | 210/164 |
| 4,578,188 | 3/1986 | Cousino | 210/170 |
| 4,925,552 | 5/1990 | Butson et al. | 210/254 |
| 5,433,845 | 7/1995 | Greene et al. | 210/532.1 |
| 5,498,331 | 3/1996 | Monteith | 210/532.1 |
| 5,531,888 | 7/1996 | Geiger et al. | 210/170 |
| 5,543,064 | 8/1996 | Butler | 210/521 |
| 5,725,760 | 3/1998 | Monteith | 210/532.1 |
| 5,746,911 | 5/1998 | Park | 210/254 |
| 5,753,115 | 5/1998 | Monteith | 210/532.1 |
| 5,849,181 | 12/1998 | Monteith | 210/532.1 |

*Primary Examiner*—Christopher Upton
*Attorney, Agent, or Firm*—Edward H Oldham

[57] ABSTRACT

An interceptor tank for primary treatment of rainwater runoff which may contain a variety of pollutants. The tank is a multi-chambered device which provides a partial separation of the pollutants contained in the effluent rainwater. A bypass system prevents overload of the tank during periods of heavy inflow conditions. Under low inlet flow conditions, an orifice in the bypass system functions to allow the effluent to drop into the first chamber which serves as a trash and debris collector. The effluent passes from the first chamber to a second chamber where free petroleum based products are separated and held. The effluent from the second chamber passes into a third chamber where sediment is separated from the effluent. The effluent from the third chamber may be fed back into the bypass conduit to be fed into a sewer system or alternately through an aperture in one of the exterior walls of the last chamber to a sewer. Under heavy inflow conditions the level of the effluent stream raises, only a portion of the effluent may enter the first chamber (as controlled by the size of the orifice), the balance of the input stream passes over the orifice and into the last chamber of the tank or directly into the sewer system (f the bypass system continues through the third chamber).

18 Claims, 3 Drawing Sheets

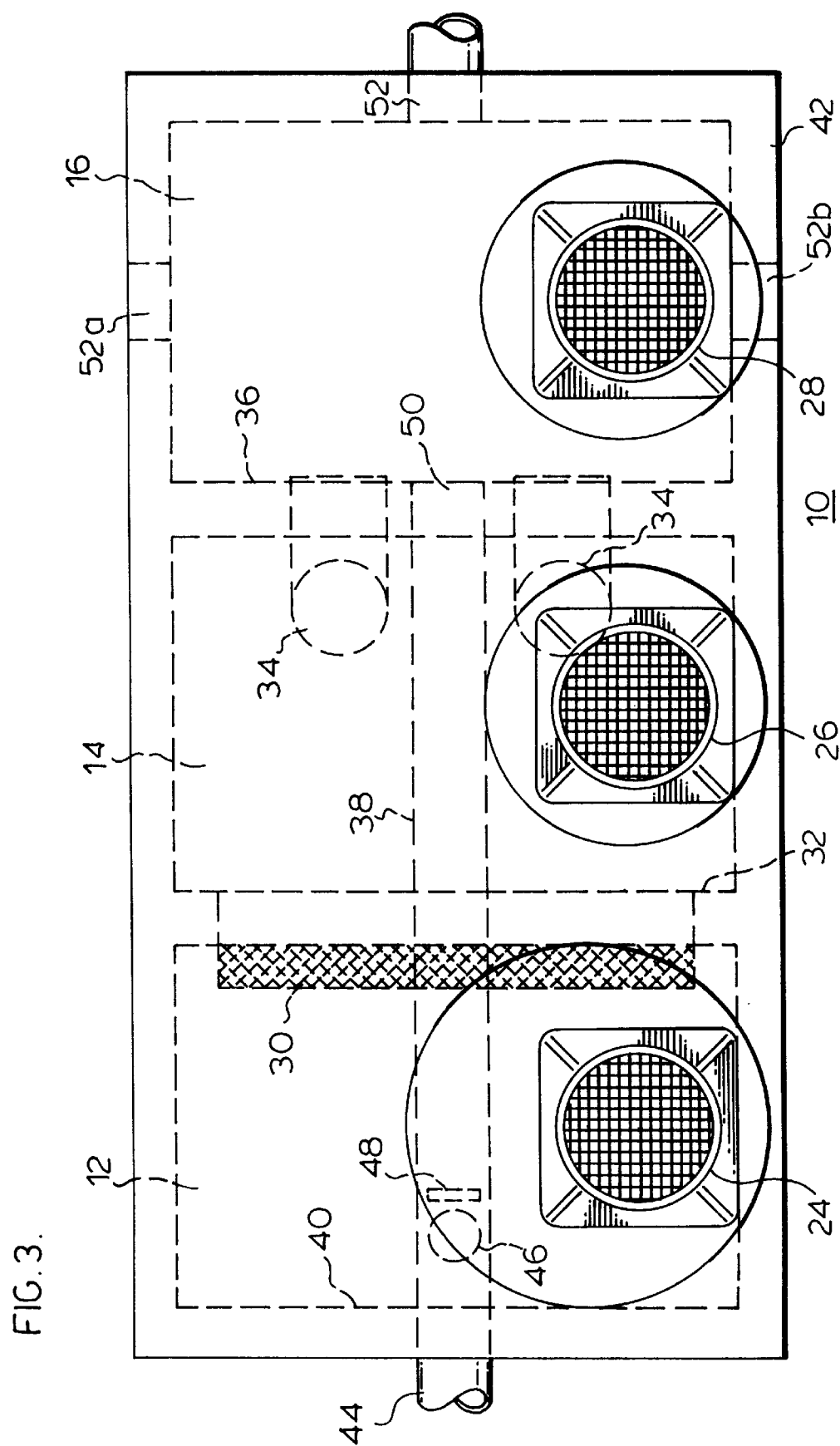

OIL/GRIT INTERCEPTOR

BACKGROUND OF THE INVENTION

This application is a continuation-in-part of U.S. patent application Ser. No. 08/126,687 filed Oct. 7, 1996 now abandoned.

This invention generally relates to interceptor devices used in association with drains and storm sewers to remove and store pollutants which are contained in rainwater runoff. In the past, these pollutants have been collected in storm sewage systems and passed into lakes, rivers and streams with little concern for the long term effects of these contaminants in the ecological system.

The invention is also useful under conditions where a spill of a material harmful to the ecological system has occurred in that the spilled material may be caught and temporarily held in the interceptor until some remedial action can be taken. As the environmental issues become more prominent, more and more regulating agencies have incorporated regulations incorporating primary rainwater runoff treatment to improve the quality of the water discharged from a storm sewage system into its ultimate destination.

Single chamber devices have been placed in the sewage systems to collect and hold runoff contaminants but the performance of these devices have at times been less than adequate.

The tank forming the collection chamber must be of substantial size to prevent the passage of the contaminants into the sewage system during heavy runoff conditions. Any turbulent flow in the chamber has a tendency to disturb the layers of contaminants being held in the chamber and pass them into the sewage system.

DESCRIPTION OF THE PRIOR ART

In order to avoid such problems devices such as the device of U.S. Pat. No. 4,985,148 has been suggested to collect and hold contaminants in rainwater runoff. This device utilizes a bypass system to prevent unwanted turbulent flow in the chamber during high flow conditions. This device attempts to control the amount of runoff that may enter the settling chamber during any given time. The device of U.S. Pat. No. 4,985,148 has several disadvantages. Because the device consists of a single chamber, all the aqueous contaminants must be trapped and held in the same chamber. Thus, surface trash, petroleum based contaminants, and sedimentary contaminants must all be simultaneously held preferably in a manner that each group of contaminants may be separately collected from the device at periodic intervals. This requirement implies that the device must have substantial volumetric capacity (to permit separation and to control turbulent flow through the chamber) and the device must be therefore of a robust construction.

The above patent uses a weir to control the flow into the collection chamber, which in combination with a pair of downwardly extending conduits prevents large flow into the collection chamber during periods of heavy runoff conditions.

U.S. Pat. No. 5,053,747 describes a complex single chamber collection device which utilizes baffles, flap valves and pumps to achieve the desired result.

U.S. Pat. No. 4,253,965 to Pielkenrood uses an emergency overflow to avoid overtaxing the settling system.

Other pertinent prior art is listed below:

U.S. Pat. No. 4,363,731
U.S. Pat. No. 4,328,101

SUMMARY OF THE INVENTION

The interceptor tank of this invention comprises a multi-chambered device having chamber interconnecting devices to permit aqueous flow between chambers. In most instances trash and coarse petroleum based contaminants will be caught and trapped in a first chamber, excess petroleum based contaminants passed from the first chamber will be found in a second chamber. Contaminants having a specific gravity greater than water will be allowed to settle and be trapped in a third chamber.

A conduit which serves as an input for the aqueous product containing contaminants to be trapped, passes through the device. The conduit contains an orifice which communicates with the first chamber. This orifice sets a limit on the amount of aqueous product that can be introduced into the device at any given time. The orifice in the conduit permits the overflow for aqueous product to provide the complete bypass of the tank by the overflow aqueous product under extremely high flow conditions. In one embodiment of the invention, the conduit has a second orifice downstream from the first orifice to permit the treated aqueous product to re-enter the conduit and exit the interceptor tank. The conduit pipe is sloped so that the inlet orifice is located at some height above the exit orifice. The height of the liquid in the interceptor tank is maintained at a level equal to the level of the exit orifice in the bypass conduit.

BRIEF DESCRIPTION OF THE DRAWINGS

FIG. 3 shows a plan view of the tank of FIG. 2.

DESCRIPTION OF THE PREFERRED EMBODIMENT

Figure 1:
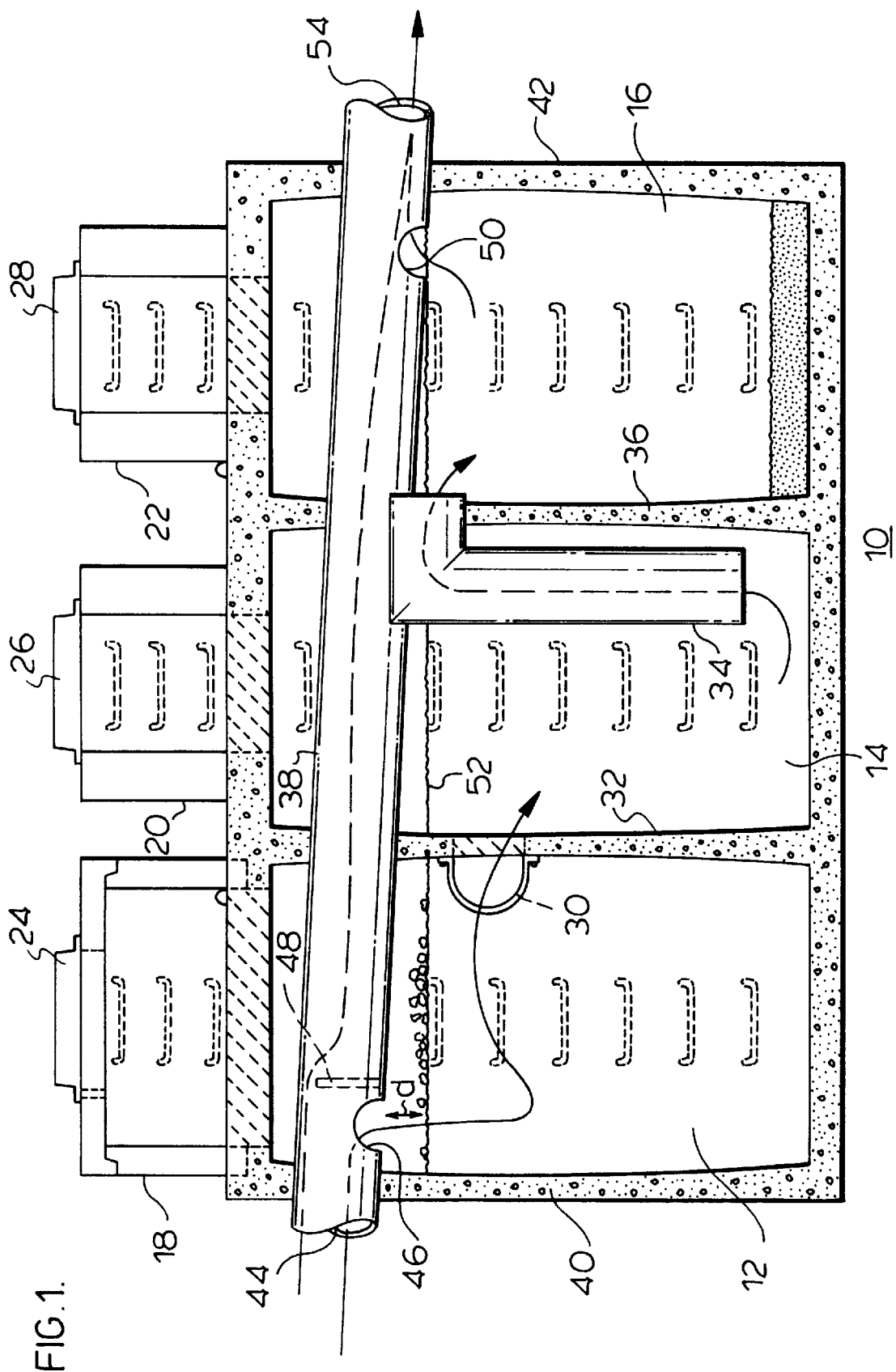
FIG. 1 shows cross section of the interceptor tank of this invention.

An interceptor tank 10 is shown in cross section having chambers 12, 14 and 16. The tank is of a robust nature and is preferably concrete.

Chambers 12, 14 and 16 are provided with risers 18, 20 and 22 and hatches 24, 26 and 28 are located at the top of the hatches.

Ladders 30, 32 and 34 are shown in phantom for the convenience of service personnel. Chamber 12 is provided with a screen 30 in wall 32 to keep trash particles from passing into chamber 14. Chamber 14 is supplied with one or more siphons 34 which provide a conduit for the liquid at the bottom of chamber 14 to pass into chamber 16 through wall 36.

A conduit 38 is mounted in tank 10 to pass entirely through the tank.

Conduit 38 passes through wall 40, wall 32, wall 36 and wall 42 and is sealed at each wall. The conduit is provided with an inlet orifice 46 which empties into chamber 12. The size of orifice 46 is carefully chosen to throttle the input stream to the tank 10 to keep turbulence in the tank to a minimum. A weir 48 (in phantom) may be provided in conduit 38 just downstream from orifice 46 as shown depending on the application of the interceptor 10.

At the opposite end of conduit 38 is a second orifice 50. As with orifice 46, orifice 50 also opens at the bottom of the conduit 38. Orifice 50 determines the level of the liquid in the tank 10. As the level of the liquid is increased beyond the level 52, liquid from chamber 16 flows into orifice 50 and exits through outlet 54. The interceptor tank 10 (in this instance shown having three chambers) functions as follows:

Under equilibrium conditions, tank 10 is always full, that is, the level of the liquid in the tank will remain at the level indicated at 52. As rainwater (carrying contaminants) enters the inlet 44, the rainwater passes through orifice 46 and drops the short distance "d" as shown on FIG. 1 in chamber 12. As long as orifice 46 is able to deliver all the rainwater entering the inlet 44 the liquid in chamber attempts to increase its height and as a consequence liquid in chamber 12 passes through screen 30 in wall 32. Under spill conditions, the same separating process will occur. If weir 48 is present, the water entering inlet 44 will be held in the inlet portion of conduit 38 until orifice 46 reaches its designed maximum flow whereupon any excess water will pass over weir 48.

Left behind in chamber 12 is a wide variety of trash, with trash such as paper, wood and foamed plastic floating on the top of the liquid in chamber 12 and trash having a specific gravity greater than water sinking to the bottom. This would include metal objects, rock pieces, etc. sand and glass pieces and other sediments.

Any free petroleum product carried by the rainwater will rise to the top of the chamber 12 and the petroleum product layer continues to build until the layer has a depth extending downwardly to the top of screen 30. After reaching this depth, the petroleum product bleeds across wall 32 at screen 30 and rises to the top of chamber 14. The build up of petroleum product continues in chamber 14 at the top thereof until service technicians remove it by pumping. The petroleum product will continue to build in both chambers.

Siphon 34 is present to assure that only aqueous product containing no free petroleum based materials passes from chamber 14 to chamber 16. Additional settling of any suspended solids will occur in chamber 16. The sediment here is of a fine nature and chamber 16 is effective for collecting heavy particles and other finely divided contaminants having a specific gravity greater than water.

The interceptor tank 10 continues to function to collect contaminants and trap these contaminants in situ until servicing is required.

Under heavy inlet flow conditions, orifice 46 reaches its maximum design capacity and any further increase in input flow of the rainwater in the inlet either flows past orifice 46 and over weir 48 (if present). At this time, rainwater in the conduit passes through conduit and past orifice 50 to outlet 54.

The size of orifice 46 is somewhat critical and is such as to prevent turbulence in the chambers 12, 14 and 16. Orifice 46 is of such size that fairly large articles of trash may pass through without plugging the orifice. Orifice 46 is sized to limit the magnitude of the flow into chamber 12 to such a value that chamber 12 will never become pressurized.

The interceptor tank 10 continues to provide the entrapment of contaminants even while in a bypass mode. It is important that none of the trapped contaminants are allowed to escape, thus any turbulence in the chambers 12, 14 and 16 is to be avoided. It is appreciated that the price paid for the prevention of turbulence in the tank 10 is that some contaminants are passed into the sewer or drain at output 54 under bypass conditions.

Note the complete absence of conduits at orifices 46 and 50 present in some of the prior art devices. This invention envisages a clear drop from orifice 46 to the liquid level 52 in chamber 12.

During service, oil, fats, and grease will be found in chamber 12 and 14. These substances will be found at the top of each chamber. Trash will be found at the top and bottom of chamber 12. Sediment will be found on the bottom of chamber 12. Sediment will be found on the bottom of chambers 12, 14 and 16. Chambers 12, 14 and 16 may be serviced by pumping to remove the floating fats and oils, etc., and the heavy.

In practice, this device is of a fairly large size typically 25 cubic meters capacity, thus, the conduit 38 may be 60 cm diameter. Orifices 46 and 50 are typically 25 cm in diameter. Tank 10 is of a robust concrete construction and thus may be constructed to withstand the heavy traffic of parking lots, etc.

It has been found that this device is effective in separating contaminants from rainwater entering the system even in the presence of bypass conditions. The device is relatively self sufficient requiring only occasional pumping to remove contaminants therefrom. No moving parts such as are found in some of the prior art devices are present to fail or operate improperly. For the most part, this device is maintenance free. The slope of conduit 38 is important, as it is imperative that orifice 46 is located some distance above the level of the liquid in chamber 12. This assures that the liquid at the top of chamber 12 may never be introduced into the conduit in high bypass condition.

Figure 2:
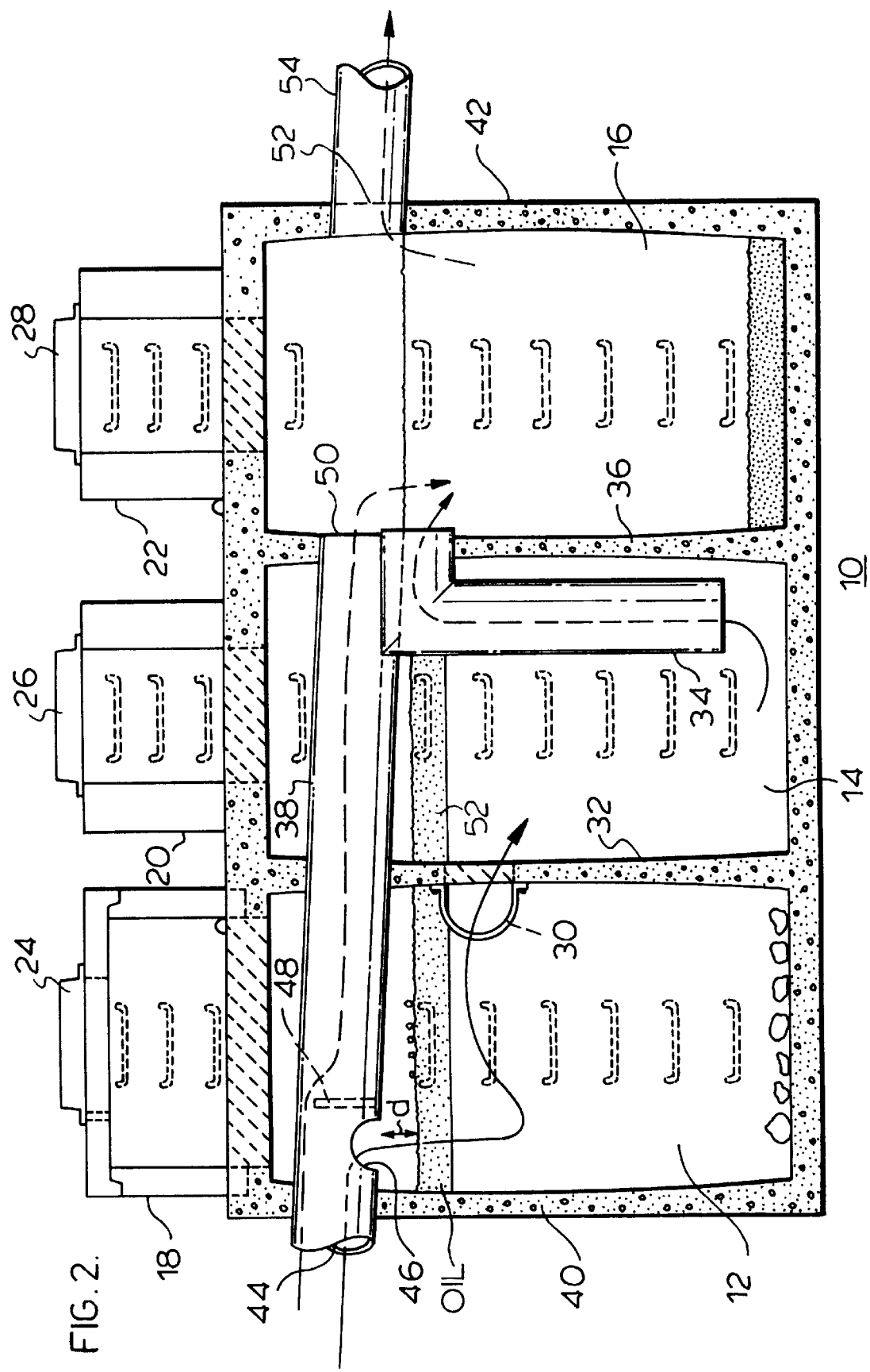
FIG. 2 shows a cross-section of a modified interceptor tank of this invention.

FIG. 2 illustrates a tank similar to that shown in FIG. 1 with the exception of the bypass pipe 38. In the instance, pipe 38 terminates at wall 36. Similar parts of FIG. 2 bear the same reference numerals in the corresponding parts of FIG. 1.

In FIG. 2, pipe 38 terminates at 50 at the end of interwall 36 of tank 10. An exit port 52 provides for the egress of the liquid in compartment 16.

In FIG. 2, under normal flow conditions, where the pipe 38 is not in a bypass flow condition, the interceptor tank functions in a manner similar to the tank of FIG. 1. (Again as in FIG. 1, a weir 48 may or may not be present, depending on application). That is, liquid flows into pipe 44, drops through orifice 46, drops a distance "d" into the compartment 12 and as a results of the inflow into compartment 12, a corresponding flow of liquid must pass through screen 30 into compartment 14, and thence through siphon 34 into chamber 16 where the liquid exits through exit port 52 into exit pipe 54. The bottom of pipe 54 determines the level of liquid in chambers 12, 14 and 16 and any tendency to increase the height of the liquid in the chambers of the tank 10 results in flow through exit port 52, once equilibrium conditions have been established.

The exit port 50 of pipe 38 also is located to have the bottom of the port 50 level with the liquid level in tanks 12, 14 and 16.

Thus, under bypass conditions, when liquid is flowing past the orifice 46 (and over weir 48 if present), the bypass liquid passes through the shortened pipe 38 of FIG. 2 and flows into chamber 16 at the level of the liquid at the top of chamber 16. This provides a minimal disturbance to the liquid in chamber 16. Excessive liquid in chamber 16 exits from port 52.

FIG. 3 shows tank 10 in plan view. For most instances, exit port 52 with associated exit pipe 54 carry the liquid in chamber 16 to the sewage system.

It may be convenient for a utility to have an exit port on another wall of chamber 16. In this instance, exit ports 52a and 52b may be utilized to provide an exit for the liquid in chamber 16. Ports 52, 52a and 52b may be provided by suitable weakened areas in the wall which may be quickly "knocked out" to provide the necessary exit port.

In this manner, a utility may use the tank 10 as a distribution box to not only separate the sediment and oil from the incoming water, but also as a conduit to change the direction of flow of water between the input and output.

It must be remembered that an interceptor tank must be matched to the probable flow expected for each individual application.

Larger tanks can of course, handle large flows without yielding to turbulent flow conditions and surrendering their trapped pollutants.

Three chambers seems to be the best compromise solution to functional utility and cost.

Obvious changes will be apparent to those skilled in the art but applicant wishes to limit the protection of this invention by the scope of the following claims.

We claim:

1. A multi-chambered interceptor tank for the removal of contaminants from water entering said tank, said tank having at least two chambers having communication means between the chambers to permit serial liquid flow through the first to the last chambers of said tank, so as to maintain the level of the liquid in said chambers at substantially the same level, a sloping conduit passing through at least the first and last chambers of said tank, said conduit having an inlet and an outlet, first orifice means in said conduit near said inlet in communication with said first chamber, said orifice being located a predetermined distance above the liquid in said first chamber, second orifice means near the outlet of said conduit in communication with said last chamber at the liquid level, said first orifice being of such size as to permit bypass of liquid in said conduit when the flow of liquid into said inlet exceeds a predetermined flow.

2. A multi-chambered interceptor tank as claimed in claim 1 wherein said tank includes three chambers.

3. A multi-chambered interceptor tank as claimed in claim 2 wherein said sloping conduit passes through all three chambers.

4. A multi-chambered interceptor tank as claimed in claim 3 wherein said sloping conduit contains a weir of a predetermined height just downstream form said inlet orifice.

5. A multi-chambered interceptor tank as claimed in claim 3 wherein the first and second chambers are in communication with each other through a screen opening located just below the level of the liquid in said tank.

6. A multi-chambered tank as claimed in claim 5 wherein the second and third tanks are in communication with each other by a siphon means.

7. A multi-chambered tank as claimed in claim 6 wherein each chamber is provided with a riser and hatch.

8. A multi-chambered interceptor tank as claimed in claim 2 wherein said sloping conduit passes through the first two chambers of said interceptor and empties into the third chamber.

9. A multi-chambered interceptor tank as claimed in claim 8 wherein said sloping conduit contains a weir of predetermined height just downstream from said inlet orifice.

10. A multi-chambered interceptor tank as claimed in claim 9 wherein the first and second chambers are in communication with each other through a screen opening located just below the level of the liquid in said tank.

11. A multi-chambered tank as claimed in claim 10 wherein the second and third tanks are in communication with each other by a siphon means.

12. A multi-chambered tank as claimed in claim 11 wherein each chamber is provided with a riser and hatch.

13. A concrete interceptor tank in the form of a right parallelepiped comprising three interconnected chambers formed by a first and second upstanding concrete walls in said tank, sloping conduit means in said tank, passing completely through said tank and each of said walls, said first wall having a screened opening therein at a first predetermined height for communication between said first and second chambers, said second wall having at least one siphon means mounted therein at a second predetermined height for communication between said second and third chambers, hatch means provided on said tank for access to each chamber of said tank, said sloping conduit means having an input and output, a first orifice in said conduit means near said input and being in communication with said first chamber, a second orifice in said conduit means near the output and being in communication with said third chamber at a liquid level, said first orifice being at a predetermined height above said second orifice in said tank.

14. A tank as claimed in claim 13 wherein said sloping conduit means contains a weir of a predetermined height just slightly downstream from said first orifice.

15. A method of preventing turbulence in an interceptor tank comprising;

providing a tank having a plurality of interconnected chambers which includes at least an inlet and outlet chamber for separating water borne pollutants from an inlet stream, providing a sloping conduit in said tank near the top thereof, and passing therethrough, providing an outlet orifice in said conduit in communication with said outlet chamber of said tank for controlling the level of liquid in said tank chambers by providing an escape for liquid in said outlet chamber, providing an inlet orifice in said conduit in communication with said inlet chamber at a predetermined height above said outlet orifice, controlling the flow of water to a predetermined maximum quantity with said inlet orifice permitting any water in excess of the predetermined maximum to flow past said inlet orifice and past said second orifice in said conduit to exit said tank.

16. A method as claimed in claim 15 wherein a weir is provided in said sloping conduit just downstream from said inlet orifice.

17. A concrete interceptor tank in the form of a right parallel piped, comprising a first, second and third interconnected chambers separated by a first and second upstanding interior walls, said first wall having a screened opening therein at a first predetermined height for communication between said first and second chambers, said second wall having at least one siphon means mounted at a second predetermined height for communication between said second and third chamber, hatch means provided on said tank to provide access to the chambers of said tank, sloping conduit means located near the top of said tank to provide an input for liquid to said tank, said conduit means sloping downwardly through said tank from the input at the entrance at an exterior wall of said first chamber and subsequently passing through said first and second interior walls and terminating in an output in said third chamber, said sloping conduit having an orifice located in said first chamber downstream from said input, said orifice being located a third predetermined height above the liquid in said first chamber, exit means for the liquid in said third chamber being located at a fourth predetermined height in one of the exterior walls of said third chamber.

18. A concrete interceptor tank as claimed in claim 17 wherein said sloping conduit means contains a weir of predetermined height installed slightly downstream from said orifice located in said first chamber.

* * * * *